United States Patent
Bagwell et al.

(10) Patent No.: US 9,686,483 B2
(45) Date of Patent: Jun. 20, 2017

(54) PIXEL WITH SWITCHABLE HIGH GAIN AND HIGH CAPACITY MODES

(71) Applicant: Forza Silicon Corporation, Pasadena, CA (US)

(72) Inventors: Sam Bagwell, Glendale, CA (US); Jonathan Bergey, Kennett Square, PA (US); David Estrada, Northridge, CA (US)

(73) Assignee: Forza Silicon, Inc., Pasadena, CA (US)

( * ) Notice: Subject to any disclaimer, the term of this patent is extended or adjusted under 35 U.S.C. 154(b) by 0 days.

(21) Appl. No.: 14/990,591

(22) Filed: Jan. 7, 2016

(65) Prior Publication Data

US 2016/0198101 A1    Jul. 7, 2016

Related U.S. Application Data

(60) Provisional application No. 62/100,540, filed on Jan. 7, 2015.

(51) Int. Cl.
| | | |
|---|---|---|
| *H04N 5/33* | (2006.01) | |
| *H04N 5/378* | (2011.01) | |
| *H04N 5/357* | (2011.01) | |
| *H04N 5/355* | (2011.01) | |

(52) U.S. Cl.
CPC ............. *H04N 5/33* (2013.01); *H04N 5/3559* (2013.01); *H04N 5/3575* (2013.01); *H04N 5/378* (2013.01)

(58) Field of Classification Search
CPC .... H04N 5/23241; H04N 5/232; H04N 5/375; H04N 5/3575; H04N 5/3745
See application file for complete search history.

(56) References Cited

U.S. PATENT DOCUMENTS

| | | | | |
|---|---|---|---|---|
| 5,892,540 A | * | 4/1999 | Kozlowski | ........... H04N 5/3658 250/208.1 |
| 2013/0341490 A1 | * | 12/2013 | Mansoorian | ...... H01L 27/14634 250/208.1 |
| 2014/0016027 A1 | * | 1/2014 | Yang | .................. H04N 5/23241 348/372 |
| 2016/0100114 A1 | * | 4/2016 | Bergey | ................. H04N 5/3575 348/250 |

* cited by examiner

*Primary Examiner* — Casey Bryant
(74) *Attorney, Agent, or Firm* — Mountain IP, pLLC

(57) ABSTRACT

Provided herein is a novel pixel circuit for image sensors such as IR ROIC image sensors. The design provides a switchable pixel with two modes. In the first mode, the pixel performs in-pixel correlated double sampling to remove reset noise. In the second mode, the pixel is configured in a high-capacity mode to avoid saturation. The pixel may be dynamically switched between modes, for example in response to lighting conditions in the scene to be imaged.

5 Claims, 1 Drawing Sheet

PIXEL WITH SWITCHABLE HIGH GAIN AND HIGH CAPACITY MODES

CROSS-REFERENCE TO RELATED APPLICATIONS

This application claims the benefit of priority to U.S. Provisional Application Ser. No. 62/100,540 entitled "Pixel with Switchable High Gain and High Capacity Modes," filed Jan. 7, 2015, the contents of which are hereby incorporated by reference.

REFERENCE TO SEQUENCE LISTING, A TABLE, OR A COMPUTER PROGRAM LISTING COMPACT DISK APPENDIX

Not Applicable.

STATEMENT REGARDING FEDERALLY SPONSORED RESEARCH OR DEVELOPMENT

Not Applicable.

BACKGROUND AND SUMMARY OF THE INVENTION

Infrared image sensors are widely used in a variety of applications. Many such sensors rely on pixels having a charge transimpedance amplifier (CTIA) pixel design.

Reset noise is a dominant noise source in CTIA-based pixels. One strategy for reducing such noise is the use of correlated double sampling (CDS), wherein the level of accumulated charge in the reset pixel is measured and this measurement is subtracted from the signal charge to remove the noise component. There can be significant overhead to implementing the CDS function downstream from the pixel, in that two successive reads are required, thus doubling the readout bandwidth requirements and impacting overall system power. It is therefore advantageous to be able to perform the CDS functionality within the pixel circuit. Accordingly, a pioneering in-pixel CDS function has been developed, as described in pending United States Patent Application Publication Number 20140016027 by Yang et al, entitled "In-Pixel CTIA Correlated Double Sampling with Snapshot Operation for IR Readout Integrated Circuits."

A prior art CTIA-based IR readout integrated circuit (ROIC) Pixel with in-pixel CDS is shown in FIG. 1. The role of the CTIA is to maintain a fixed reverse-bias on the IR Photodetector (101), while integrating the photocurrent onto a feedback capacitor (105) thus converting it to a measureable voltage. The photodetector output line (102) inputs to the negative input of a single output differential amplifier (103). Before imaging can commence, the CTIA integration node voltage must be reset to a known value VRESET, by shorting the input and output of the CTIA amplifier together through reset switch 104. During this reset phase, the amplifier then drives the output (integration node) to the same voltage that is on the positive input of the buffer amplifier (106).

The correlated double sampling operation is achieved by using a clamp voltage 109. The clamp voltage is switched by a clamp switch 110 onto the output line. The timing of the operation is carried out by releasing the clamp switch 110 some period of time, e.g., 10-100 ns, after releasing the reset switch 104. This is based on the inventor's recognition that carrying out the reset causes a disturbance in the operational amplifier being used as the buffer. The system allows enough time for the resulting reset disturbance to settle transiently before the integration voltage is permitted to AC-couple to the other side of the correlated double sampling capacitor 108. Once the clamp voltage switch 110 is released, the reset level is stored across the correlated double sampling capacitor 108. Then, the correlated double sampling side of the capacitor 107 follows the normal integration of charge from the CTIA onto the integration node 112 and forms the resultant signal level for the pixel as the difference between the amount of charge at node 112 and the clamping value that was previously placed on node 113 and was stored across the capacitor 108. That signal forms the output signal which is input to the pixel readout circuit 111, for example comprising a source follower. This output signal is a linear function of the settled reset value and the integrated signal level, thus cancelling the reset noise. The reset noise is generated by the uncertainty in the total amount of charge (kTC noise) of the reset switch and is a function of the total input capacitance and feedback capacitance of the given CTIA circuit. For a high-gain CTIA, this reset noise can be hundreds or more electrons, input-referred. Therefore, removal of this noise source is critical for low-noise imaging operation.

The present invention builds upon the prior in-pixel CDS technologies by adding additional, optional functions to the pixel. Specifically, presented herein is an IR ROIC pixel design which can switch between low noise and high capacity modes.

An IR ROIC has a fixed well capacity of electrons that can be integrated per cycle, and also has an inherent noise signal. In a low light imaging context, it is advantageous to use a high gain amplifier, wherein a high signal to noise ratio insures that the low input signal is not swamped by noise. The sensitivity that is attained using a high gain amplifier is further enhanced if CDS operations are used as well. However, the use of a high gain amplifier means that the dynamic range of the pixel is reduced, and bright portions of a scene will saturate the well capacity of the sensor. In order to maximize pixel well capacity, the amplifier gain must be kept low, which is not ideal for dimly lit scenes where noise is an issue. The choice between maximizing sensitivity and maximizing capacity is not available in prior art IR sensor pixel designs, which are generally constrained to a single sensitivity and well capacity setting and are not optimized for both low and high light.

Advantageously, the present invention provides the art with a solution to this quandary. Disclosed herein is a novel pixel readout architecture which allows the pixel to be run in either a high sensitivity mode or a high capacity mode, as described below.

DETAILED DESCRIPTION OF THE INVENTION

The invention encompasses the use a dual-use capacitor that can be deployed in one of two functions. In one mode, the dual-use capacitor is utilized to store the pixel reset signal and allows the implementation of in-pixel CDS. In this mode, the amplifier feedback factor is low and amplifier gain is high. Thus, in this mode of operation the pixel is optimized for high sensitivity imaging, with high signal to noise ratio and CDS functionality enabled to further reduce the impact of noise on the signal measurement.

In the alternative mode, the dual-use capacitor is deployed to increase the capacitance of the CTIA feedback loop, resulting in lower amplifier gain, meaning that a larger range of input signal can fit within the pixel's capacity to accumulate charge. In this mode, the pixel is optimized for higher dynamic range.

The invention provides an efficient use of limited space to extend the capabilities of the pixel. As the demand for higher resolution arrays and smaller pixel pitch increase, there is less area available for bulky capacitors needed for CDS functionality or low-gain functionality. However, the CDS functionality becomes less critical as the pixel gain decreases, as the lower CTIA gain reduces the impact of the reset noise. The invention takes advantage of this balance by enabling the dual-function capacitor to be deployed where it will optimize sensor capabilities.

In one aspect, the invention is directed to novel circuits of the invention which can be switched between a first mode with high gain and which performed in-pixel correlated double sampling and a second mode with high pixel capacity. In one embodiment, the switchable pixel utilizes a dual-use capacitor which can be connected in alternate configurations in order to enable each of the two modes. In one aspect, the invention is directed to methods of operating a switchable pixel in a high gain/CDS mode or a high capacity mode. In one aspect, the invention is directed to methods of switching a switchable pixel circuit of the invention between the two modes, for example, in response to varying light conditions in the scene to be imaged.

The novel circuits of the invention comprise a dual-use capacitor. The alternate modes may be enabled by a simple arrangement of switches which put the dual-use capacitor in one of two configurations: (1) in series between the amplifier output and the readout amplifier, for CDS functionality; or (2) in parallel with the feedback capacitor of the amplifier feedback loop, for a low gain, high capacity mode.

Figure 1:
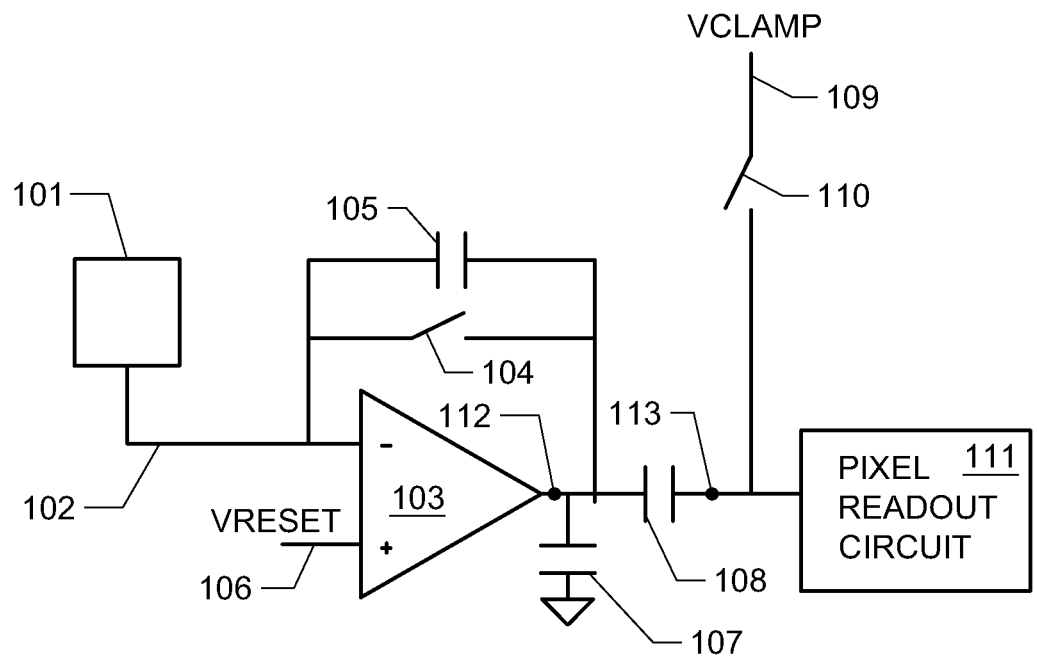
FIG. 1 depicts a prior art circuit having in-pixel CDS function.
Figure 2:
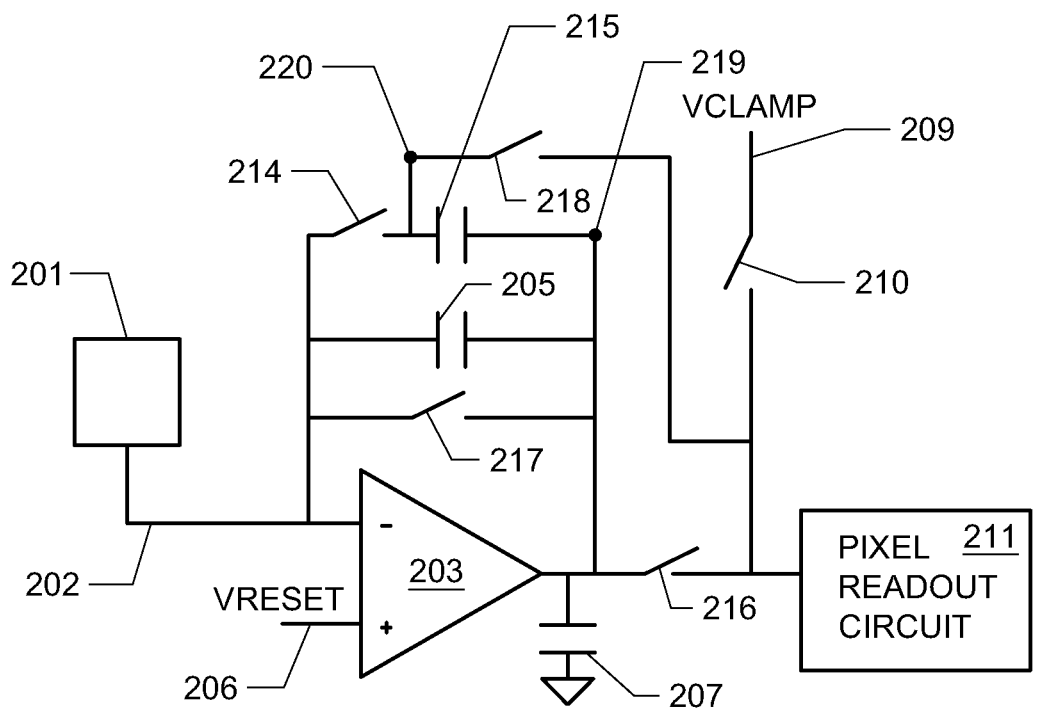
FIG. 2 depicts an exemplary circuit of the invention, capable of being switched between high-gain or CDS modes.

An exemplary implementation of the invention is depicted in FIG. 2. Referring to FIG. 2, to implement in-pixel CDS, the switch 218 is closed and switches 214 and 216 are opened. This will configure the pixel in a way that is very similar to that shown in FIG. 1, with CDS function. The CDS operation is achieved by releasing the voltage clamp switch 110 some period of time after releasing the reset switch 217. As above, this allows the resulting reset disturbance to settle transiently before the integration voltage is permitted to AC-couple to the other side of the dual-use capacitor 215. Once the CDS Clamp is released, the Reset level is stored across dual-use capacitor 215. Then the CDS side of the capacitor follows the normal integration of charge from the CTIA onto the integration node and is the resultant signal level for the pixel, being the difference between the amount of charge at node 220 and the clamping value that was previously placed on node 219 and was stored across the dual-use capacitor 215. The output signal is a linear function of the reset level and the integrated signal level, e.g. the signal level minus the reset level. In this implementation, the capacitance of feedback capacitor 205 alone sets the gain of the CTIA circuit in this mode.

To implement low-gain mode, switch 218 is opened and switches 214 and 216 are closed. This will place the dual-use capacitor 215 in parallel with feedback capacitor 205, increasing the total capacitance of the feedback loop and decreasing the CTIA gain. The CTIA will now directly drive the pixel readout circuit, without a CDS functionality.

The capacitors of the circuits of the invention may comprise any capacitor element known in the art, for example, metal plate capacitors and polysilicon-based capacitors. Multiple capacitors can be combined to obtain the desired functionality of the single capacitors depicted in the exemplary embodiment.

Switches may comprise any switching element known in the art, for example bipolar junction transistor circuits, field effect transistor circuits, and metal oxide semiconductor including either p-type or n-type, and complementary transistor pair arrangements such as transmission gates.

Alternative configurations achieving the same result are within the scope of the invention. Additionally, it will be understood that while the pixel architecture of the invention is especially advantageous when implemented in IR ROIC sensors, the inventive concepts described herein may be implemented in any other type of image sensor, for example CMOS image sensors.

The dual-mode pixels described herein may be implemented in an array of pixels, as found in an IR image sensor, for example in a homogeneous array of pixels or a hybrid array comprising pixels of the invention intermixed with pixels of an alternative design.

The dual modes of the pixel may be implemented in any number of control schemes which open and close the switching network of switches 214, 216, and 218 in each pixel to change modes as desired. In arrays of pixels comprising the dual-function pixels of the invention, each pixel is configured to receive control signals which can switch the switch network of each pixel to enact high sensitivity or high capacity modes. All the pixels in an array may be placed under the control of a master controller that simultaneously switches the pixels between the two modes. In one embodiment, the dual modes are activated in an alternating or sequential fashion, such that both high capacity and high sensitivity image data is collected by the pixel array, for example in alternating frames or other combinations (e.g. three frames in one mode, one frame in the opposing mode). In another embodiment, the master mode controller switches the pixels between modes in response to a manual command, for example by the action of a human user toggling a switch which selects the mode. Alternatively, the master mode controller may be controlled by an automated function which switches the mode in response to light conditions. For example, such a system may include detectors and analysis tools which analyze the overall nature of the scene to be imaged (e.g. by light metering or sampling), and which switches the pixels to a high gain, high sensitivity mode when light is low, and which switches the pixels to a low gain, high capacity mode when a brighter scene (or key portion of the scene) requiring a higher dynamic range is imaged. In one embodiment, a hybrid pixel array is created by the action of the master controller, wherein some pixels in the array are operated in CDS mode and some are operated in high-gain mode.

All patents, patent applications, and publications cited in this specification are herein incorporated by reference to the same extent as if each independent patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A charge transimpedance amplifier readout circuit which can be alternately switched between a correlated double sampling configuration and a high capacity configuration, wherein
   the charge transimpedance amplifier readout circuit comprises a single output differential amplifier, wherein the positive input of the amplifier is a reset voltage source and the negative input is the output of a photodetector;
   wherein a feedback capacitor is present in a feedback loop between the amplifier output and the negative amplifier input;
   wherein a reset switch can be closed to short the amplifier output to its negative input and the two plates of the feedback capacitor to each other;
   wherein the circuit comprises a clamping voltage source which can be connected or disconnected to the circuit by a clamping voltage switch;
   wherein the circuit comprises a dual-use capacitor which can be connected to the circuit in alternate configurations by the action of switches;
   wherein the correlated double sampling configuration comprises the dual-use capacitor being connected in series between the amplifier output and transiently being connected to the clamping voltage source, such that the dual-use capacitor may store a reset value for correlated double sampling operation; and
   wherein the high capacity configuration comprises the dual-use capacitor being connected in parallel with the feedback capacitor, increasing the total feedback capacitance and decreasing the gain of the amplifier.

2. The charge transimpedance amplifier readout circuit of claims 1
   wherein the photodetector is an infrared detector.

3. A method of operating a charge transimpedance amplifier readout circuit in two alternate modes comprising a correlated double sampling mode and a high capacity mode, wherein the charge transimpedance amplifier readout circuit comprises a single output differential amplifier, wherein the positive input of the amplifier is a reset voltage source and the negative input is the output of a photodetector;
   wherein a feedback capacitor is present in a feedback loop between the amplifier output and the negative amplifier input;
   wherein a reset switch can be closed to short the amplifier output to its negative input and the two plates of the feedback capacitor to each other;
   wherein the circuit comprises a clamping voltage source which can be connected or disconnected to the circuit by a clamping voltage switch;
   wherein the circuit comprises a dual-use capacitor which can be connected in a first and a second configuration by the action of switches which are under the control of a controller;
   the method comprising the steps of
   enabling the correlated double sampling mode by controlling the switches such that the dual-use capacitor is configured such that it is transiently connected in series between the amplifier output and the clamping voltage source, such that it may store a reset value for correlated double sampling operation; and
   enabling the high capacity mode by controlling the switches such that the dual-use capacitor is configured such that it is connected in parallel with the feedback capacitor, increasing the total feedback capacitance and decreasing the gain of the amplifier.

4. The method of claim 3, wherein
   the switching between modes is activated by a human user.

5. The method of claim 3, wherein
   the switching between modes is automated and is activated in response to detection of light conditions in the scene to be imaged.

* * * * *